US009363777B2

(12) United States Patent
Wu et al.

(10) Patent No.: US 9,363,777 B2
(45) Date of Patent: Jun. 7, 2016

(54) FAST RECOVERING FOR NETWORK LISTENING SCHEMES IN SYNCHRONIZATION OVER AIR FOR SMALL CELLS

(75) Inventors: Gaojin Wu, Beijing (CN); Yi Wu, Beijing (CN); Xingchen Guo, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 13 days.

(21) Appl. No.: 14/407,612

(22) PCT Filed: Jun. 14, 2012

(86) PCT No.: PCT/CN2012/076891
§ 371 (c)(1),
(2), (4) Date: Dec. 12, 2014

(87) PCT Pub. No.: WO2013/185318
PCT Pub. Date: Dec. 19, 2013

(65) Prior Publication Data
US 2015/0173033 A1    Jun. 18, 2015

(51) Int. Cl.
*H04W 56/00* (2009.01)
*H04J 11/00* (2006.01)
*H04L 5/14* (2006.01)

(52) U.S. Cl.
CPC ......... *H04W 56/001* (2013.01); *H04J 11/0079* (2013.01); *H04L 5/14* (2013.01); *H04W 56/0015* (2013.01); *H04J 2011/0096* (2013.01)

(58) Field of Classification Search
CPC ............ H04W 56/001–56/005; H04J 11/0079; H04J 2001/0096; H04L 5/14
USPC ....................................................... 370/328
See application file for complete search history.

(56) References Cited

U.S. PATENT DOCUMENTS

| | | | | |
|---|---|---|---|---|
| 6,463,110 B1 * | 10/2002 | Rinderknecht | .... | H03H 17/0286 375/355 |
| 6,704,380 B1 * | 3/2004 | Kaewell | .................... | H03L 7/06 375/367 |

(Continued)

FOREIGN PATENT DOCUMENTS

| CN | 1878054 A | 12/2006 |
|---|---|---|
| CN | 101615948 A | 12/2009 |

OTHER PUBLICATIONS

3GPP TR 36.922 V10.0.0 (Apr. 2011); 3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 10), (74 pages).

(Continued)

*Primary Examiner* — Afsar M Qureshi
(74) *Attorney, Agent, or Firm* — Harrington & Smith

(57) ABSTRACT

The present invention provides methods, apparatuses and a program relating to fast recovering for network listening schemes in synchronization over air for small cells. The present invention includes tracking, at a first base station, a reference signal of a second base station, determining, whether the reference signal can be tracked, if it is determined that the reference signal can be tracked, adjusting, at the first base station, a system clock of the first base station based on the reference signal of the second base station, and estimating and storing parameters relating to a frequency difference between the system clock of the first base station and a system clock of the second base station, and if it is determined that the reference signal cannot be reliably tracked, adjusting the system clock of the first base station based on the stored parameters.

8 Claims, 4 Drawing Sheets

(56) References Cited

U.S. PATENT DOCUMENTS

| | | | | |
|---|---|---|---|---|
| 9,204,421 | B2* | 12/2015 | Harris | H04W 68/005 |
| 2002/0073228 | A1* | 6/2002 | Cognet | H04J 3/0644 709/236 |
| 2011/0092231 | A1* | 4/2011 | Yoo | H04B 1/7097 455/501 |
| 2011/0286349 | A1 | 11/2011 | Tee et al. | 370/252 |
| 2011/0287760 | A1 | 11/2011 | Noma | 455/422.1 |

OTHER PUBLICATIONS

IEEE 1588; IEEE Standard for a Precision Clock Synchronization Protocol for Networked Measurement and Control Systems; IEEE Instrumentation and Measurement Society; IEEE Std 1588™-2008; New York, NY 10016-5997, USA, Jul. 24, 2008, (289 pages).

* cited by examiner

FAST RECOVERING FOR NETWORK LISTENING SCHEMES IN SYNCHRONIZATION OVER AIR FOR SMALL CELLS

FIELD OF THE INVENTION

The present invention relates to fast recovering for network listening schemes in synchronization over air for small cells. More particularly, the present invention relates to methods, apparatuses and a program relating to fast recovering for network listening schemes in synchronization over air for small cells.

BACKGROUND OF THE INVENTION

For LTE (Long Term Evolution) TDD (Time Division Duplex), the inter-cell interferences of eNB (evolved NodeB) to eNB or HeNB (Home eNB) to HeNB and UE (User Equipment) to UE are related to the cell synchronization. In order to overcome the above interferences, strict synchronization is required. The synchronization requirement for a HeNB is defined as the difference in radio frame start timing, measured at the transmit antenna connectors, between the HeNB and any other HeNB or eNB which has overlapping coverage. The synchronization requirement shall be set to 3 µs in all cases, except when the HeNB gets its synchronization when performing network listening of cells with propagation distance greater than 500 m. This requirement shall apply independent of the synchronization technique used (i.e. GPS (Global Positioning System), IEEE 1588 v2, Network Listening), as defined in document 3GPP TR 36.922.

Small cell solution is becoming more and more important in the LTE network both for coverage, capacity and traffic offloading. For TD-LTE (Time Division-LTE) system, the synchronization technology of small cells is critical because of the DL/UL (Downlink/Uplink) interference issue. Considering the GPS signal strength of the indoor environment and the network support of the IEEE 1588v2, network listening has been considered as the essential method embedded in the small cells (not only femto but also pico or other small cells without GPS).

Among the above mentioned three synchronization techniques, network listening can be used in scenarios where GPS and IEEE 1588 v2 do not work. For this reason, network listening is an essential synchronization scheme for TD-LTE HeNBs in those scenarios. The technique in which a HeNB derives its timing from a synchronized eNB or HeNB (which in turn may be GNSS (Global Navigation Satellite System)-synchronized) is referred to as "synchronization using network listening".

In the network listening mode, the HeNB may periodically track one or more signals from the donor cell. Currently, in 3GPP TR 36.922 there are two fully backward compatible schemes for tracking the Common Reference Signal (CRS) which have been proposed: one that uses MBSFN (Multicast Broadcast Single Frequency Network) subframes and one that uses the guard period between DL and UL transmission.

Actually the network listening is not only required by the HeNB but also by any small cell without GPS or IEEE 1588 v2. In a recently presented concept called 'Flexi Zone', the Heterogeneous Network architecture will include both the indoor and outdoor small cell clusters for traffic offload and capacity solution. In a LTE TDD network, the synchronization between the neighboring small cells would be critical.

Currently, both alternative network listening schemes proposed in 3GPP depend on the CRS tracking, either in particular MBSFN subframes or in guard period between DL/UL switching. According to the two algorithms, whenever the CRS tracking fails, the listening cell has to turn off the Tx (Transmitter) and restart the cell search process, i.e. the HeNB works as a UE to search the synchronization signals from the neighbouring cells. This would cause a restart of the cell and all the UEs inside the cell will be affected. Therefore, a high frequency of cell search process would result in a very bad user experience.

Practically considering the complex indoor wireless environment and unexpected changes of the environment between neighbouring cells, especially if the small cell is outdoor or in some hot spot, the CRS tracking may fail due to several different reasons:
1) the donor cell is off;
2) the signal transmission environment between the donor cell and the listening cell is changed permanently so that the listening cell could not find the donor cell.
3) the signal transmission environment between the donor cell and the listening cell is changed dynamically due to some temporary interference or shielding source in a short period.

It is noted that the third scenario mentioned above may happen frequently in a real network. Based on a TD-LTE femto eNB prototype developed by the applicant of the present application, and by implementing the network listening algorithm, it has been verified in real test that the CRS tracking may be dropped for a short while dynamically.

FIG. 1 schematically shows a Donor HeNB 10 having an antenna 11 and a listening HeNB 20 having an antenna 21. When the listening HeNB and Donor HeNB are set close enough to each other, the CRS tracking worked quite stable with a synchronization accuracy as high as ±100 ns. However, when the distance between the two cells is increased up to 20 meters or more across an office room, the CRS tracking was observed to be often dropped for a short while due to the disturbing environment, e.g. caused by walking people in between or the like.

According to the current algorithm described in 3GPP, both of the two schemes will suffer from the frequent restart problem due to the CRS tracking failure in scenario 3 described above. Therefore, a robust method to solve this problem is highly recommended.

SUMMARY OF THE INVENTION

According to the present invention, there are provided methods, apparatuses and a program relating to fast recovering for network listening schemes in synchronization over air for small cells.

According to an aspect of the invention there is provided a method comprising:
tracking, at a first base station, a reference signal of a second base station, determining, whether the reference signal can be tracked,
if it is determined that the reference signal can be tracked, adjusting, at the first base station, a system clock of the first base station based on the reference signal of the second base station, and
estimating and storing parameters relating to a frequency difference between the system clock of the first base station and a system clock of the second base station, and
if it is determined that the reference signal cannot be reliably tracked,
adjusting the system clock of the first base station based on the stored parameters.

According to further refinements as defined under the above aspect, the method further comprises
measuring a time during which the reference signal cannot be tracked, and if the measured time exceeds a predetermined threshold, stopping adjusting the system clock and starting a cell search process;
receiving a turn off notification from the second base station, and stopping adjusting the system clock and starting a cell search process.

According to another aspect of the invention there is provided a base station, comprising:
a tracking unit configured to track a reference signal of another base station,
a determining unit configured to determine whether the reference signal can be tracked,
an adjusting unit configured to adjust a system clock of the base station based on the reference signal of the another base station, if it is determined that the reference signal can be tracked, and
an estimating unit configured to estimate parameters relating to a frequency difference between the system clock of the base station and a system clock of the another base station, and
a storing unit configured to store the estimated parameters, wherein
the adjusting unit is further configured to adjust, if it is determined that the reference signal cannot be reliably tracked, the system clock of the base station based on the stored parameters.

According to further refinements as defined under the above aspect, the base station further comprises
a timer configured to measure a time during which the reference signal cannot be tracked, wherein if the measured time exceeds a predetermined threshold, the adjusting unit is configured to stop adjusting the system clock, and the base station is configured to start a cell search process;
a transceiver configured to receive a turn off notification from the another base station, wherein the adjusting unit is configured to stop adjusting the system clock, and the base station is configured to start a cell search process.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to another aspect of the invention there is provided a base station, comprising:
means for tracking a reference signal of another base station,
means for determining whether the reference signal can be tracked,
means for adjusting a system clock of the base station based on the reference signal of the another base station, if it is determined that the reference signal can be tracked, and
means for estimating parameters relating to a frequency difference between the system clock of the base station and a system clock of the another base station,
means for storing the estimated parameters, and
means for adjusting, if it is determined that the reference signal cannot be reliably tracked, the system clock of the base station based on the stored parameters.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, embodiments of the present invention are described by referring to general and specific examples of the embodiments, wherein the features of the embodiments can be freely combined with each other unless otherwise described. It is to be understood, however, that the description is given by way of example only, and that the described embodiments are by no means to be understood as limiting the present invention thereto.

As discussed above, the CRS tracking may be failed due to different reasons. As for scenario 1 and 2 as described above, where the donor eNB is off or the listening eNB could not "hear" the donor eNB anymore due to some physical change, the listening eNB has to turn off the Tx and restart the cell search process. This will lead to a cell-level reboot, breaking the current communications of all users in the listening cell.

However, it is noted that if the CRS tracking failure is caused by interference or shielding obstacle temporarily, as described in scenario 3, the cell search process and cell rebooting is not necessary.

Figure 1:
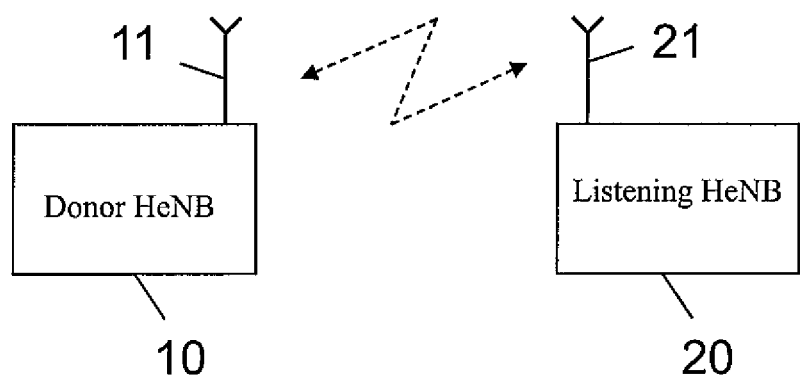
FIG. 1 is a schematic overview of a network listening test scenario.
Figure 2:
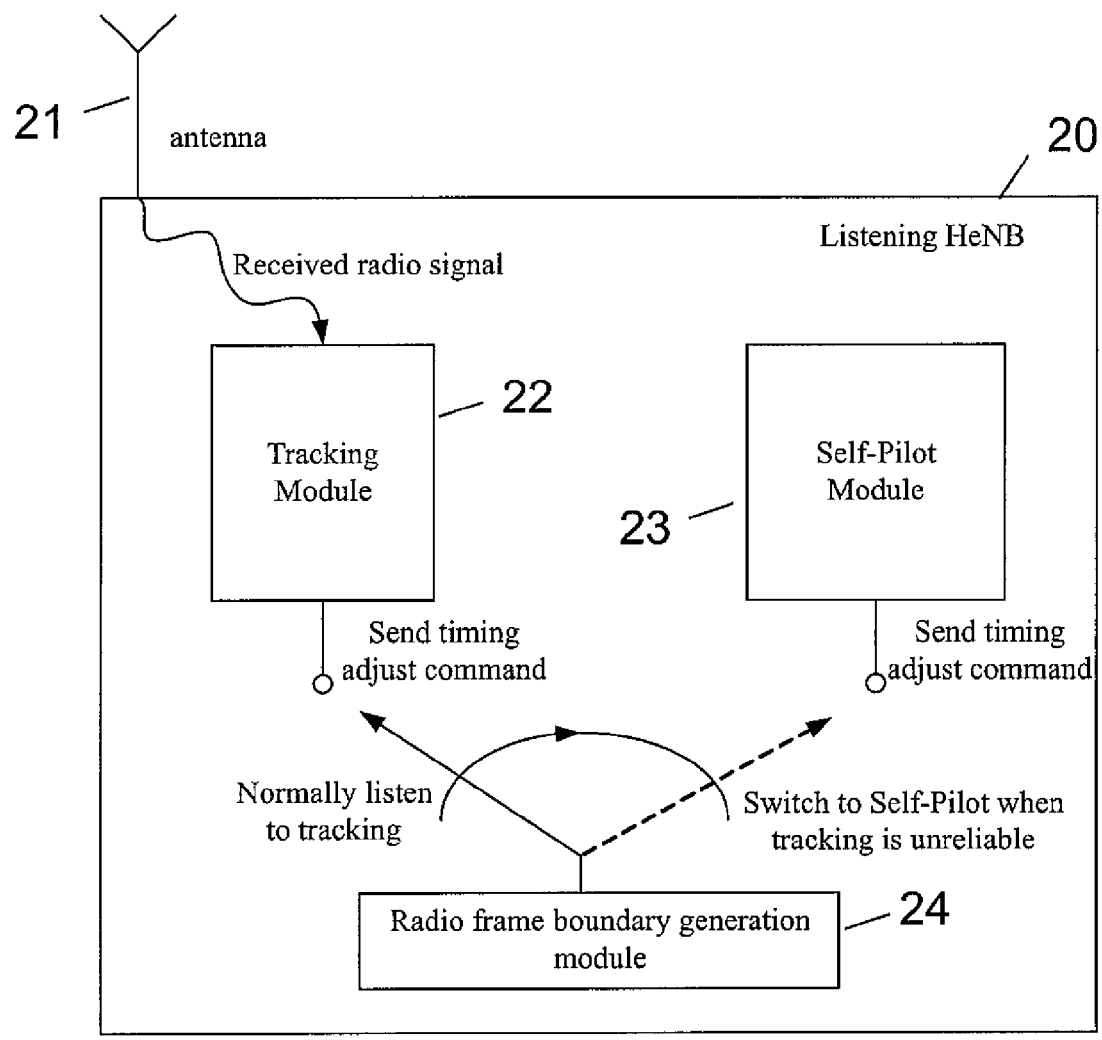
FIG. 2 is a schematic overview of a base station according to certain embodiments of the present invention.

Thus, the idea of this invention is that during CRS tracking process the listening eNB could have an estimation of the frequency difference between system clocks of the donor eNB and listening eNB and build a simulation model (Self-Pilot Module as shown in FIG. 2) based on self learning of the history. In this way, when the CRS tracking is failed, the listening eNB does not need to immediately turn off the Tx and enter the cell search process. It could autonomously adjust the system clock according to the already tuned Self-Pilot Module and wait until either the CRS tracking succeeds again or a predefined timer expires or a turn-off notification of the donor eNB is received from the OAM (Operation, Administration and Maintenance) system or X2 interface.

The proposed features of the present invention are listed below:
1) During normal CRS tracking, a simulation model of clock adjustment (Self-Pilot Module) is built based on the self-learning of history.
2) When CRS tracking fails, the eNB does not need to immediately give up the CRS tracking and enter the cell-search process for new cell searching and synchronization. Instead, the listening eNB enables the Self-Pilot Module for self adjustment of the system clock in order to extend the life of the "synchronization status". Here, this extending time is referred to as "self-pilot status".

3) The listening eNB continues CRS tracking in each tracking opportunity during the self-pilot time. Whenever the CRS tracking is successful again, it switches from the self-pilot status to the real tracking status.

4) If the listening eNB receives any turn-off notification of the donor eNB from the OAM or core network or X2 interface, it would stop the self-pilot process and immediately turn off its Tx, and start the cell search process.

5) A timer would be predefined according to the frequency accuracy of the system clock so that this timer determines how long the self-pilot process could maintain timing synchronization between donor and listening eNB without successful CRS tracking. When the timer expires, the self-pilot has to be stopped and new cell search will be initiated.

A schematic example of the overall architecture of the listening eNB 20 is shown in FIG. 2. The listening eNB 20 comprises a tracking module 22, a Self-Pilot module 23 and a radio frame boundary generation module 24. The listening HeNB's 20 radio frame timing is controlled and adjusted by tracking module 22 when tracking is successful, otherwise by Self-Pilot module 23. The listening HeNB 20 will stay in self-pilot status until it receives any turn-off notification of donor eNB, or the predefined timer expires indicating Self-pilot module's invalidity, or tracking module recovers.

The details of the Self-pilot algorithm will be described in the following.

In scenario 3 described above, impact caused by interference or shielding obstacle is temporary. So, if the synchronization accuracy is maintained during such short period, fast recovering can be achieved after the interference time passes. In other words, after interference ends, listening HeNB can successfully track donor HeNB without the help of cell search, thereby avoiding cell restart and bad user experiences. Under this motivation, the above mentioned Self-Pilot algorithm is proposed to maintain timing accuracy when tracking is temporarily absent or unreliable.

In the interfering duration, the radio link is fragile, rendering listening HeNB's tracking module out of gear. Under this circumstance, listening HeNB's radio frame boundary is quite likely to be drifting away from donor HeNB's frame boundary because their system clocks are running at different rates. The most significant influential factor causing such different rates is crystal frequency difference. It should be noted that the following adopted crystal frequency characteristic model is quite comprehensive and generic, so other factors influencing frame timing, if existing, can be incorporated into this model and can be treated indiscriminately. Therefore, the present invention is not limited to the crystal frequency characteristic model but also includes cases of other frame timing influences.

Crystal output frequency, described as an example, is affected by time, temperature, acceleration, Ionizing radiation, power supply voltage and etc. The time difference between two crystal clocks at time t after synchronization at time 0 can be formulated as (cf.: document 1: Vig J. R. Quartz crystal resonators and oscillators for frequency control and timing applications—A tutorial, AD-A328861 Rev. 8.4.2. U.S. Army Communications-Electronics Command, Fort Monmouth, N.J. 07703, USA, January 2000, chapter 4, chapter 8):

$$T(t) = T_0 + \int_0^t R(t)dt + \varepsilon(t) = T_0\left(R_0 t + \frac{A(t)}{2}t^2 + \ldots\right) + \int_0^t E_i(t)dt + \varepsilon(t) \quad (1)$$

In formula 1, $T_0$ is the synchronization residual error at t=0; R(t) is the frequency difference between the two clocks under comparison, $R(t)=R_0+A(t)t+\ldots+E_i(t)$; $\epsilon(t)$ is the error due to random fluctuations; A(t) is aging term (higher order terms are included if aging factor is not linear); $E_i(t)$ is frequency difference due to environmental effects (temperature, etc).

When listening HeNB is in self-pilot status, the self-pilot module shall use formula 1 to real-time predict the time differences between listening and donor HeNB, and compensate for the difference continuously to keep synchronization error within a small range. So when the tracking module is out of work, the self-pilot can be a successful substitute.

In this regard, it is noted that perfectly simulating the frequency differences between the two clocks is nearly impossible because they are affected by many time-variant and random factors. Further, it is noted that the time difference formula (formula 1) needs to be simplified to fit into practical implementations.

The time-variant terms in the formula are not changing very dramatically over time, according to document 1. So the whole HeNB running time is evenly divided into numerous small time blocks (called LTB, Learning Time Block). The duration of a LTB is T, on the scale of minutes, or even hours. Within each LTB, all the terms of the formula can be deemed constant and can be estimated using various algorithms such as Least Square or MMSE (minimum mean-square estimation). Additionally, $E_i(t)$ can be set to 0 because the temperature is stable in indoor environment; $\epsilon(t)$ can be neglected because its contribution is trivial, though quite complex; $T_0$ can also be neglected because the residual time difference is small when tracking is working fine. As the aging factor, A is changing rather slowly and A is also small when compared with $R_0$. After all, formula 1 becomes:

$$T(t)=R_0 t \quad (2)$$

Figure 3:
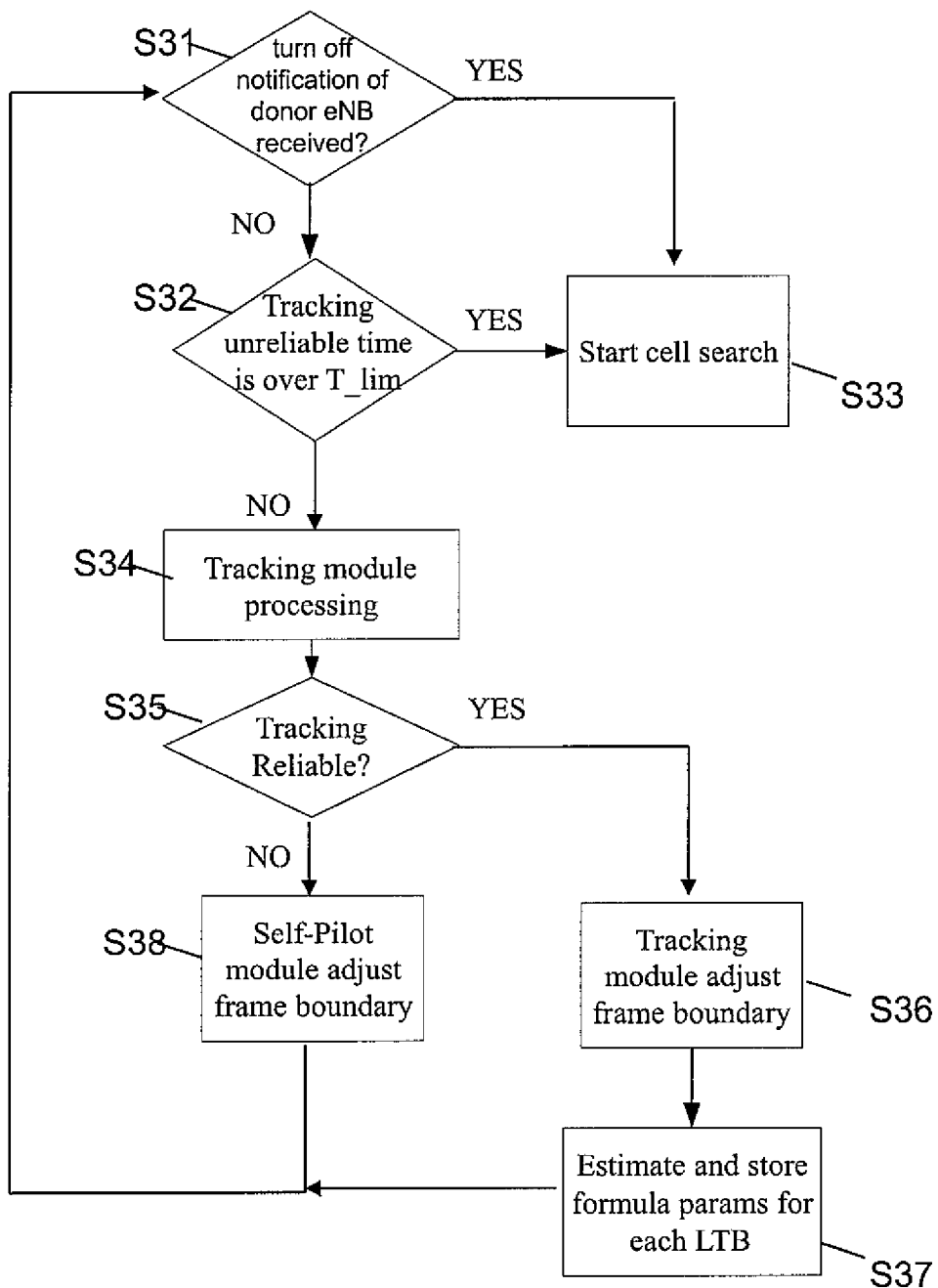
FIG. 3 is a flowchart illustrating processing of the base station according to certain embodiments of the present invention.

The detailed procedure of the whole fast recovering scheme is illustrated in FIG. 3.

In step S31, it is checked whether a turn off notification of the donor eNB is received. If such a turn off notification is not received, it is checked in step S32, whether a tracking unreliable time has exceeded a threshold value T_lim or not.

Then, if it is determined in step S31 that a turn off notification is received or if it is determined in step S32 that the tracking unreliable time has exceeded the threshold T_lim, the cell search is started in step S33.

If it is determined in step S32, that the tracking unreliable time has not exceeded the threshold T_lim, in step S34, the tracking module keeps working irrespective of whether the tracking results are reliable or not. In the next step S35, it is then checked whether the tracking results are reliable or not.

If tracking results are reliable, frame boundary generation module 24 will follow tracking module's instructions in step S36. Meanwhile, parameters in formula 2 are estimated and updated for each LTB in step S37 and then the process returns back to step S31.

Otherwise, when tracking is not working reliably, in step S38, the Self-Pilot algorithm immediately takes over the control rights. It will use the latest updated formula 2 to predict time difference, and dynamically adjusts listening HeNB's radio frame start time to compensate for the time difference. During this time, tracking module is not idle though its rights to adjust radio frame timing are withdrawn. Tracking will keep monitoring received signal or other indicators to check whether tracking module can work reliable. Then, after step S38, the process returns back to step S31.

Hence, as described above, if listening HeNB receives turn-off notification of the donor HeNB, it should immediately start cell search to find a new donor HeNB. Likewise, if tracking module keeps being unreliable too long, say more than T_lim, then it indicates that the environmental change between donor and listening HeNB may be permanent. So listening HeNB should also instantly start cell search.

It should be noted that the criteria defining tracking module working reliably or not can be very generic. CRS's signal noise power ratio is a good candidate. Tracking module's timing adjust amount being normal or not can also be an indicator. Of course it is noted that these criteria are mentioned merely as examples and that the invention is not limited to these criteria.

In view of the above, it is an advantage of the present invention that synchronization between donor and listening HeNB can be maintained when tracking is out of work. As a result, tracking can recover successfully without restarting the cell. The above described proposal works both for the MBSFN solution and guard period solution.

Figure 4:
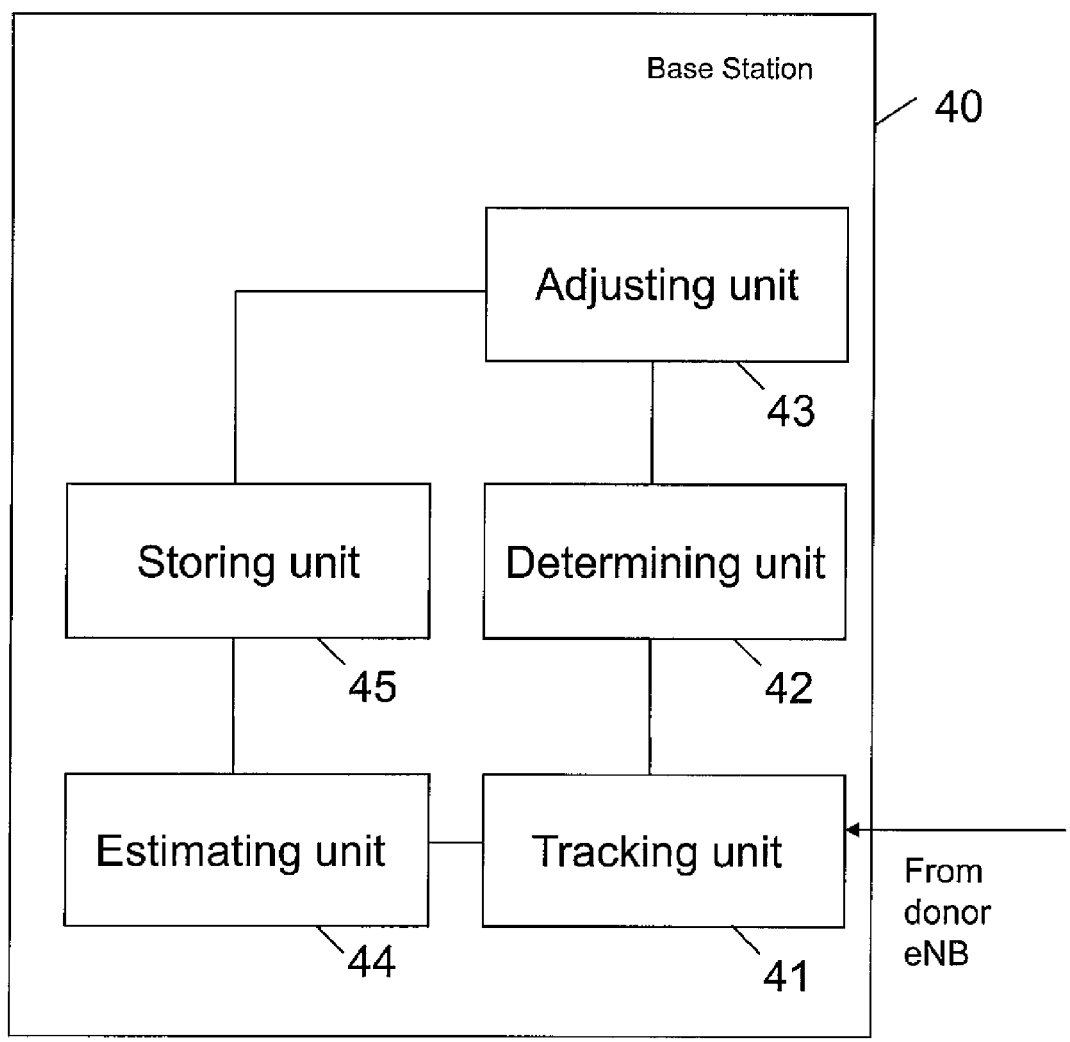
FIG. 4 is a block diagram showing an example of a base station according to certain embodiments of the present invention.

FIG. 4 is a block diagram illustrating an example of a listening eNB according to a certain embodiment of the present invention.

As shown in FIG. 4, the listening eNB 40, as an example of a base station, comprises a tracking unit 41 configured to track a reference signal of another base station, i.e. the donor eNB. Further, the listening eNB 40 comprises a determining unit 42 configured to determine whether the reference signal can be tracked. If it is determined that the reference signal can be tracked, an adjusting unit 43 is configured to adjust a system clock of the base station, i.e. the listening eNB, based on the reference signal of the another base station, i.e. the donor eNB, and an estimating unit 44 is configured to estimate parameters relating to a frequency difference between the system clock of the base station and a system clock of the another base station. The estimated parameters are then stored in a storing unit 45. The adjusting unit 43 is further configured to adjust the system clock of the base station based on the stored parameters, if it is determined that the reference signal cannot be reliably tracked.

According to further aspects of the present invention, the base station 40 further comprises a timer configured to measure a time during which the reference signal cannot be tracked, wherein if the measured time exceeds a predetermined threshold, the adjusting unit 43 is configured to stop adjusting the system clock, and the base station 40 is configured to start a cell search process.

According to a still further aspect of the present invention, the base station further comprises a transceiver configured to receive a turn off notification from the another base station, wherein the adjusting unit is configured to stop adjusting the system clock, and the base station is configured to start a cell search process.

In the foregoing exemplary description of the base station, only the units that are relevant for understanding the principles of the invention have been described using functional blocks. The base stations may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the base stations (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, base station, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

What is claimed is:

1. A method, comprising:
   tracking, at a first base station, a reference signal of a second base station, determining, whether the reference signal can be tracked,
   if it is determined that the reference signal can be tracked, adjusting, at the first base station, a system clock of the first base station based on the reference signal of the second base station, and
   estimating and storing parameters relating to a frequency difference between the system clock of the first base station and a system clock of the second base station, and
   if it is determined that the reference signal cannot be reliably tracked, adjusting the system clock of the first base station based on the stored parameters.

2. The method according to claim 1, further comprising measuring a time during which the reference signal cannot be tracked, and
   if the measured time exceeds a predetermined threshold, stopping adjusting the system clock and starting a cell search process.

3. The method according to claim 1, further comprising receiving a turn off notification from the second base station, and stopping adjusting the system clock and starting a cell search process.

4. A base station, comprising
   a tracking unit configured to track a reference signal of another base station,
   a determining unit configured to determine whether the reference signal can be tracked,
   an adjusting unit configured to adjust a system clock of the base station based on the reference signal of the another base station, if it is determined that the reference signal can be tracked, and
   an estimating unit configured to estimate parameters relating to a frequency difference between the system clock of the base station and a system clock of the another base station, and
   a storing unit configured to store the estimated parameters, wherein
   the adjusting unit is further configured to adjust, if it is determined that the reference signal cannot be reliably tracked, the system clock of the base station based on the stored parameters.

5. The base station according to claim 4, further comprising
   a timer configured to measure a time during which the reference signal cannot be tracked, wherein
   if the measured time exceeds a predetermined threshold, the adjusting unit is configured to stop adjusting the system clock, and
   the base station is configured to start a cell search process.

6. The base station according to claim 4, further comprising
   a transceiver configured to receive a turn off notification from the another base station, wherein
   the adjusting unit is configured to stop adjusting the system clock, and
   the base station is configured to start a cell search process.

7. A computer program product comprising a non-transitory computer-readable medium including a program for a processing device, comprising software code portions for performing the step of claim 1 when the program is run on the processing device.

8. The computer program product according to claim 7, wherein the program is directly loadable into an internal memory of the processing device.

* * * * *